(12) United States Patent
Holland

(10) Patent No.: US 7,628,632 B2
(45) Date of Patent: Dec. 8, 2009

(54) LOCKING MECHANISM

(75) Inventor: Gregory J. Holland, Wolcott, CT (US)

(73) Assignee: Casco Products Corporation, Shelton, CT (US)

( * ) Notice: Subject to any disclaimer, the term of this patent is extended or adjusted under 35 U.S.C. 154(b) by 0 days.

(21) Appl. No.: 12/109,738

(22) Filed: Apr. 25, 2008

(65) Prior Publication Data

US 2009/0269960 A1   Oct. 29, 2009

(51) Int. Cl.
*H01R 13/62* (2006.01)
(52) U.S. Cl. .................................. 439/309; 439/333
(58) Field of Classification Search ................ 439/335, 439/333, 357
See application file for complete search history.

(56) References Cited

U.S. PATENT DOCUMENTS

| | | | |
|---|---|---|---|
| 2,180,927 A | | 11/1939 | Johnson |
| 2,710,948 A | | 6/1955 | Lawson |
| 2,884,609 A | | 4/1959 | Fraser et al |
| 3,697,025 A | | 10/1972 | Edwards |
| 3,733,577 A | * | 5/1973 | Hammond ................ 439/357 |
| 4,915,648 A | | 4/1990 | Takase et al. |
| 5,685,730 A | * | 11/1997 | Cameron et al. ............ 439/335 |
| 5,928,539 A | | 7/1999 | Thivet |
| 6,004,161 A | | 12/1999 | Roussy et al. |
| 6,414,272 B2 | | 7/2002 | Rostan |
| 6,464,526 B1 | | 10/2002 | Seufert et al. |

* cited by examiner

*Primary Examiner*—Briggitte R Hammond
(74) *Attorney, Agent, or Firm*—Ostrolenk Faber LLP

(57) ABSTRACT

A locking mechanism comprising a socket and a body member slidably received in an opening in the socket; the socket or body member having an engageable member for exerting a bias against the other member when the body member is slidably received in the socket, the other member having a first set of channels comprising a first longitudinally disposed channel for receiving the engageable member when the body member is received in the socket, a second longitudinally disposed channel disposed parallel to the first channel spaced from the first channel, and a transverse channel connecting the first and second channels, the first channel terminating in a locking area having a depth greater than a depth of the first channel immediately adjacent the locking area and the locking area being contiguous with the transverse channel, whereby when the body member is slidably received in the socket with the engageable member received in the first channel, the engageable member will be prevented from further slidable movement in the first channel when said engageable member is received in the locking area, said engageable member being biased into said locking area and being prevented from disengaging from said locking area and thereby locking said body member into said socket. The body member can be removed by rotating the body member and withdrawing it by a pulling action whereby the engageable member slides in and out of the second channel.

18 Claims, 1 Drawing Sheet

LOCKING MECHANISM

BACKGROUND OF THE INVENTION

The present invention relates to plugs and connectors, and in particular, to a locking mechanism for locking a plug-in device into a socket or jack. The present invention can apply to connecting devices of various types, including connecting devices for making and locking electrical connections, for example. However, the present invention is not limited to electrical connectors and can be used for connectors and locking mechanisms of various types.

A common locking mechanism which is used for electrical connectors is the bayonet socket. In the bayonet socket, the plug-in device received in the socket has two radially projecting pins which are received in longitudinally directed slots in the socket. The plug-in device pins are aligned with the longitudinal channels in the socket and the device is pushed in until the pins reach the ends of the longitudinal channels. At this point, the plug-in device is rotated so that the projecting pins move in transversely disposed channels located in the socket each contiguous with a respective longitudinal channel. The transversely disposed channels include detent positions to secure the pins of the plug-in device in place in the socket against the bias of a spring.

In order to remove the plug-in device from the bayonet socket, the plug-in device must be rotated in the opposite direction and then removed by pulling the device back out of the longitudinal channels.

The bayonet socket, while well-known, requires a push and twist action to secure the plug-in device in the socket.

It is desirable to provide an improved locking mechanism which has a simpler operation to obtain securement of the plug-in device and further, which also employs a simple operation to unlock the plug-in device and remove it from the socket.

SUMMARY OF THE INVENTION

It is an object of the present invention to provide a locking mechanism for a plug-in device which is simple to use and of relatively simple construction and which further provides a simple mechanism for removal.

The above and other objects are achieved by a locking mechanism comprising a socket and a body member slidably received in an opening in the socket; the socket or body member having an engageable member for exerting a bias against the other member when the body member is slidably received in the socket, the other member having a first set of channels comprising a first longitudinally disposed channel for receiving the engageable member when the body member is received in the socket, a second longitudinally disposed channel disposed parallel to the first channel spaced from the first channel, and a transverse channel connecting the first and second channels, said first channel terminating in a locking area having a depth greater than a depth of said first channel immediately adjacent the locking area and said locking area being contiguous with said transverse channel, whereby when said body member is slidably received in said socket with said engageable member received in said first channel and slidable with a first movement in said first channel to insert the body member in the socket, said engageable member will be prevented from further slidable movement in said first channel when said engageable member is received in said locking area, said engageable member being biased into said locking area and being prevented from disengaging from said locking area and thereby locking said body member into said socket.

The invention is further operable such that said body member is removable from said socket when said engageable member is in said locking area by rotating said body member in said socket to move said engageable member into said transverse channel until said engageable member aligns with said second channel, thereby allowing said body member to be extracted from said socket by a reverse-slidable movement opposite said first movement with said engageable member moving through and out of said second channel.

Other features and advantages of the present invention will become apparent from the following description of the invention which refers to the accompanying drawings.

BRIEF DESCRIPTION OF THE DRAWING(S)

The invention will now be described in greater detail in the following detailed description with reference to the drawings in which.

DETAILED DESCRIPTION OF PREFERRED EMBODIMENTS OF THE INVENTION

Figure 2:
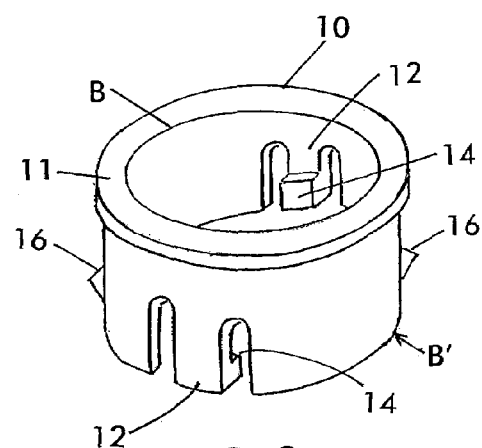
FIG. 2 shows the socket for the plug-in device.

With reference now to the drawings, the present invention comprises a mounting ring or socket 10 as shown in FIG. 2 which is received in a mounting hole 20 in a panel 21, and a plug-in device 30 which may have electrical connections, not shown, that engage with electrical connections, also not shown, in the socket 10 or on a device located adjacent to the socket 10.

The mounting ring or socket 10 has flexures 12 with lock tabs 14. The mounting ring or socket may be made of any suitable material, but one suitable material might comprise a plastic material, with the flexures 12 integrally formed. The mounting ring 10 also includes panel mounting tabs 16 which project radially outwardly. The lock tabs 14 project radially inwardly.

Figure 3:
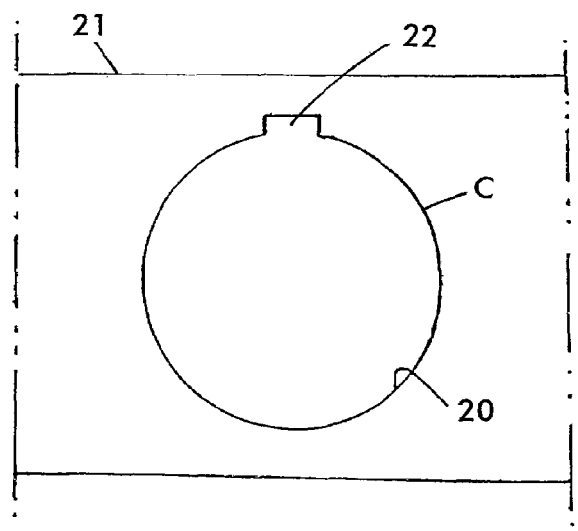
FIG. 3 shows an opening in a panel for receiving the socket.

The mounting ring 10 has an external diameter B' which is received in the diameter C of the mounting hole 20 in the panel (FIG. 3). Accordingly, the mounting ring 10 is first inserted in the mounting hole 20 in the panel. The mounting hole 20 may have a keyed feature 22 which is adapted to receive a projection (not shown) on the mounting ring 10 in order to allow only a single orientation of the mounting ring 10 in the hole 20 and to prevent rotation of the mounting ring 10.

The mounting tabs 16 are designed to flex radially inwardly as the mounting ring is inserted through the mounting hole 20 and are also preferably integrally formed in the mounting ring 10.

Figure 1:
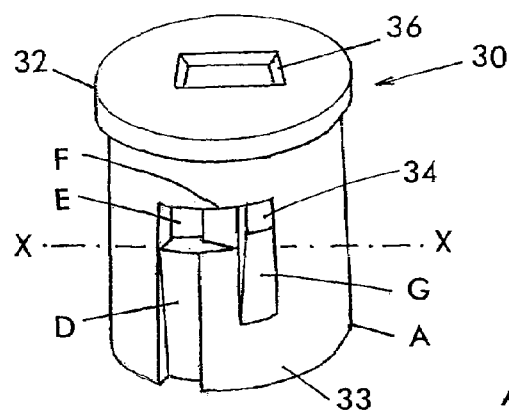
FIG. 1 shows a plug-in device according to the present invention.

The plug-in device body 30 (FIG. 1) has an outside diameter A and may have a shoulder 32 for abutting against mounting ring collar 11. The plug-in body 30 is received in the inside diameter B of the mounting ring 10. The body 30 has a first longitudinally disposed channel D which has an upwardly sloped ramp surface which terminates in a locking window E. The ramp slot D is designed to receive the lock tab 14.

Figure 4:
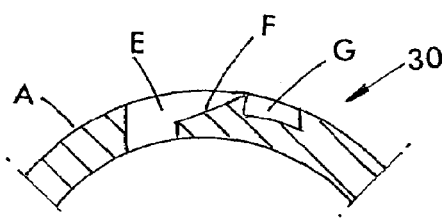
FIG. 4 shows a partial cut-away bottom view of the plug-in device of FIG. 1 along line X-X.

The body 30 further includes a transverse disengagement slot F which is aligned with the locking window E. The disengagement slot F has a ramped shape as shown in FIG. 4 in cross-section that terminates in a second longitudinal slot G which is disposed parallel to and spaced from the ramped slot D. The slot G ramps upwardly in the opposite direction to the ramp slot D.

Slot D is sloped so as to provide increasing bias against the tab 14 as the tab 14 rides along the slot D toward the locking window E. Slot G is sloped so as to provide increasing bias against tab 14 as the tab slides away from the transverse channel F.

Further, although only one set of ramp slots is shown, two sets are preferably employed. The other slot set is preferably located 180° on the opposite side of the body 30 and not shown.

Additionally, the embodiment shown has the channel sets comprising channels D, E and F on the body 30 and the flexures 15 and tabs 14 on the mounting ring 10. This arrangement could easily be reversed such that the channel sets are on the mounting ring 10 and the flexures 12 and tabs 14 are on body 30. This alternate arrangement is encompassed by the invention.

To insert the body 30 into the mounting ring 10, the channel or channels D in body 30 are aligned with the locking tabs 14. The body 30 is then pushed in with the locking tabs 14 moving up the ramp in slot D and thus flexing radially outwardly. In order to ensure that the body 30 can be inserted in only orientation, one of the lock tabs 14 is preferably narrow and one is wider and similarly, one of the ramp slots D is narrow and one is wide. Thus, the body 30 can only be inserted in one orientation. Further, to allow alignment of body 30 in the ring 10, slot D extends to the bottom surface 33 of the body 30.

As the locking tab 14 travels up the slot D, the tab 14 flexes radially outwardly. The panel locking tabs 16 are also pushed outwardly by the outer diameter A of the body 30 thereby fastening the mounting ring 10 to the panel.

When the body 30 is fully engaged in the ring 10, the locking tabs 14 of the flexures 12 will engage the windows E, flexing inwardly and thereby securing the body to the mounting ring. The tabs 14 will preferably engage in the locking window E with a "snap fit."

As can be seen, the body 30 is secured to the mounting ring by a simple pushing action. There is no need to rotate the body 30 to secure it in place. The body 30 is now fully installed to the mounting panel and cannot be removed by a simple pulling action due to the snap fit of the tabs 14 in the locking windows E. If the socket 10 includes electrical connections, these electrical connections would now be in electrical contact with the electrical contacts of the body 30. However, the body 30 and the socket 10 need not have electrical contacts and the disclosed locking mechanism could be employed as a mechanical locking device only.

When the body 30 is locked to the mounting ring 10, the tabs 14 are disposed in the locking windows E and prevent removal by pulling. To remove the body 30 from the mounting ring 10, the body must be rotated. In the embodiment shown, the body is rotated clockwise so that the locking tab 14 moves into the transverse disengagement slot F along its ramp and then into the longitudinal slot G. The further rotation of the body 30 is prevented by the wall 34 of the slot G. This prevents the body from being rotated too far. Now that the tabs 14 are aligned with the ramped slots G, the body can be pulled from the socket 10. As the body is pulled out of the socket 10, the tabs 14 flex outwardly on the upward ramped slot G until reaching the end of the slot. Once the body 30 is removed from the mounting ring, the mounting ring 10 can also be removed from the panel, if desired, because the tabs 16 can now be flexed radially inwardly when the socket 10 is removed from the mounting hole 20.

Slot G preferably terminates before bottom surface 33 because it is not used for alignment of the body 30 with the mounting ring 10 when the body 30 is initially inserted in the ring 10.

The body 30 shows a receptacle 36. This receptacle can be for an electrical connection. It may also be provided for a tool to allow easy removal of the body from the socket. For example, the tool could be a screwdriver blade or a hook shaped device.

Although the present invention has been described in relation to particular embodiments thereof, many other variations and modifications and other uses will become apparent to those skilled in the art. Therefore the present invention should be limited not by the specific disclosure herein, but only by the appended claims.

What is claimed is:

1. A locking mechanism comprising:
a socket and a body member slidably received in an opening in the socket;
the socket or body member having an engageable member for exerting a bias against the other member when the body member is slidably received in the socket,
the other member having a first set of channels comprising a first longitudinally disposed channel for receiving the engageable member when the body member is received in the socket, a second longitudinally disposed channel disposed parallel to the first channel spaced from the first channel, and a transverse channel connecting the first and second channels, said first channel terminating in a locking area having a depth greater than a depth of said first channel immediately adjacent the locking area and said locking area being contiguous with said transverse channel, whereby when said body member is slidably received in said socket with said engageable member received in said first channel and slidable with a first movement in said first channel to insert the body member in the socket, said engageable member will be prevented from further slidable movement in said first channel when said engageable member is received in said locking area, said engageable member being biased into said locking area and being prevented from disengaging from said locking area and thereby locking said body member into said socket.

2. The locking mechanism of claim 1, wherein said body member is removable from said socket when said engageable member is in said locking area by rotating said body member in said socket to move said engageable member into said transverse channel until said engageable member aligns with said second channel, thereby allowing said body member to be extracted from said socket by a reverse-slidable movement opposite said first movement with said engageable member moving through and out of said second channel.

3. The locking mechanism of claim 2, further wherein said first channel has a first ramp surface that ramps to said locking area to exert an increasing bias against said engageable member as said body member is inserted into said socket, said transverse channel has a transverse ramp surface that exerts an increasing bias against said engageable member into said second channel and the second channel has a second ramp surface that exerts an increasing bias against the engageable member as the body member is slidably extracted from the socket.

4. The locking mechanism of claim 1, further wherein said socket is receivable in a panel opening and has radially outwardly moveable projections that are biased outwardly by said body member when received in the socket to lock the socket in said panel opening.

5. The locking mechanism of claim 3, wherein there is provided a second set of channels comprising a first channel, transverse channel and second channel for receiving a second engageable member.

6. The locking mechanism of claim 5, wherein the second engageable member and second set of channels have a different width than the first engageable member and first set of channels whereby said body member can be received in only one orientation in said socket.

7. The locking mechanism of claim 6, wherein the first and second sets of channels are disposed at a predefined angle to each other.

8. The locking mechanism of claim 7, wherein the predefined angle is 180° so that the first and second sets are opposite each other.

9. The locking mechanism of claim 4, wherein the panel opening has a key for receiving a keying member and the socket to lock the socket in one orientation in the panel opening.

10. The locking mechanism of claim 1, wherein the engageable member comprises an elastic member exerting a bias against the channel into which it is received.

11. The locking mechanism of claim 1, wherein the body member has the first set of channels and the socket has the engageable member.

12. The locking mechanism of claim 11, wherein said locking area is in said body member and comprises an opening in said body member such that the engageable member snaps into said locking area.

13. The locking mechanism of claim 2, wherein said body member is rotatable into said transverse channel by a clockwise rotation.

14. The locking mechanism of claim 2, wherein said body member is rotatable into said transverse channel by a counterclockwise rotation.

15. The locking mechanism of claim 11, wherein said socket comprises a plastic material and said engageable member comprises a projection formed on an integral flexible arm of said socket, the projection directed radially inwardly to exert a bias against the channel of the body member into which the projection is received.

16. The locking mechanism of claim 1, wherein the body member and socket have interconnecting releasable electrical connectors.

17. The locking mechanism of claim 1, wherein the first channel has a length that allows initial alignment with said engageable member to allow a single orientation of said body member with said socket.

18. The locking mechanism of claim 17, wherein the second channel has a length less than the length of said first channel.

* * * * *